US007963207B2

(12) United States Patent
Hansen et al.

(10) Patent No.: US 7,963,207 B2
(45) Date of Patent: Jun. 21, 2011

(54) VIBRATOR

(75) Inventors: Robert A. Hansen, Oakdale, MN (US); Daniel Sabelko, Elk River, MN (US)

(73) Assignee: Dynamil Air Inc., St. Paul, MN (US)

( * ) Notice: Subject to any disclaimer, the term of this patent is extended or adjusted under 35 U.S.C. 154(b) by 553 days.

(21) Appl. No.: 12/150,782

(22) Filed: May 1, 2008

(65) Prior Publication Data

US 2009/0272255 A1 Nov. 5, 2009

(51) Int. Cl.
*B03C 3/34* (2006.01)
*G01M 7/04* (2006.01)

(52) U.S. Cl. .......................................... 91/234; 73/665

(58) Field of Classification Search .................... 91/232, 91/233, 234; 73/665
See application file for complete search history.

(56) References Cited

U.S. PATENT DOCUMENTS

| | | | | |
|---|---|---|---|---|
| 2,590,155 | A * | 3/1952 | Cannon | 91/234 |
| 2,911,951 | A * | 11/1959 | Swanson | 91/234 |
| 3,570,628 | A * | 3/1971 | Rodgers | 184/24 |
| 3,601,009 | A * | 8/1971 | Burgess | 91/234 |
| 3,680,442 | A * | 8/1972 | Kanning | 91/234 |
| 3,726,508 | A * | 4/1973 | Varnello et al. | 366/116 |
| 4,240,326 | A * | 12/1980 | Carle | 91/234 |
| 4,402,255 | A * | 9/1983 | Fink et al. | 91/234 |
| 5,209,564 | A * | 5/1993 | Manci et al. | 91/234 |
| 5,493,944 | A * | 2/1996 | Felkins et al. | 91/234 |
| 7,162,944 | B2 * | 1/2007 | Britz | 91/227 |
| 7,530,301 | B2 * | 5/2009 | Hansen | 91/234 |

* cited by examiner

*Primary Examiner* — Thomas E Lazo
(74) *Attorney, Agent, or Firm* — Jacobson & Johnson LLC

(57) ABSTRACT

A linear vibrator having an internal cylindrical bearing surface forming a chamber therein and a fluid inlet to direct a fluid into the chamber with a one piece piston slideable located therein with the piston simultaneously rotatable and axially displaceable therein with the piston including a static port to bias the piston and thereby induce piston oscillation when fluid is introduced into the vibrator.

20 Claims, 8 Drawing Sheets

VIBRATOR

FIELD OF THE INVENTION

This invention relates generally to vibrators and, more specifically, to self starting linear vibrators with extended life.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of non-impacting linear vibrators is known in the art, typically, a cylindrical mass oscillates back and forth in a cylindrical chamber as air flows into and out of the cylindrical chamber. Air or a fluid such as an air oil mist forms a fluid bearing that is used to support the cylindrical mass as it oscillates back and forth. While such systems provide vibration one of the difficulties with such systems is that the vibrators do not always start on-demand as the mass may stop on a dead center position where the fluid supplied to the cylindrical chamber might flow around the cylindrical mass without inducing the required oscillation of the mass. Another difficulty is that although the mass oscillates on a fluid bearing the fluid bearing the fluid bearing may not always prevent contact between the oscillating mass and the chamber walls thus causing damage to either the surface of the mass or the walls of the chamber or both which can render the vibrator inoperative.

In one embodiment of the known linear vibrators the vibrator includes a cylindrical shaped piston that is driven back and forth in a chamber by fluid that simultaneously pushes the piston back and forth as it forms an air bearing around the piston to provide essentially a frictionless surface between the piston and the housing. One of the drawbacks of such vibrators is that to ensure that the vibrator responds to the introduction of the fluid into the housing it is usually necessary to have some mechanical means such as a spring to bias the piston to facilitate initiation of the oscillating activity of the piston. That is, when fluid such as air is introduced into the chamber the piston, which is to be supported by an air bearing, might not immediately begin oscillating as air is introduced into the chamber. Consequently, if one wants to ensure vibrator start-up one needs to bias the piston to one end or the other end of the vibrator. The biasing is usually done through a mechanical device such as a spring or the like that is located at one end of the chamber in the vibrator. However, introducing mechanical start-up devices such as springs reduces the life of the vibrator since the springs eventuality break through metal fatigue.

SUMMARY OF THE INVENTION

Briefly, the linear vibrator includes a housing having an internal cylindrical bearing surface forming a chamber therein and a fluid inlet to direct a fluid into the chamber. A one piece piston is slideable located therein with the piston having a set of internal fluid passages therein and an external bearing surface located thereon. Fluid flowing between the internal cylindrical bearing surface of the housing and the external bearing surface of the piston create essentially a frictionless fluid bearing that permits the piston to slide back and forth in the chamber with very little loss in energy and virtually no wear on the internal cylindrical bearing surface of the housing or the external bearing surface of the piston. A set of offset input ports in the piston provides a rotational torque to the piston to enhance the fluid bearing and thereby extend the life of the vibrator A static port in the piston provides an unbalancing force to initiate startup of the vibrator without interfering with the dynamic operation of the linear vibrator.

DESCRIPTION OF THE PREFERRED EMBODIMENT

Figure 1A:
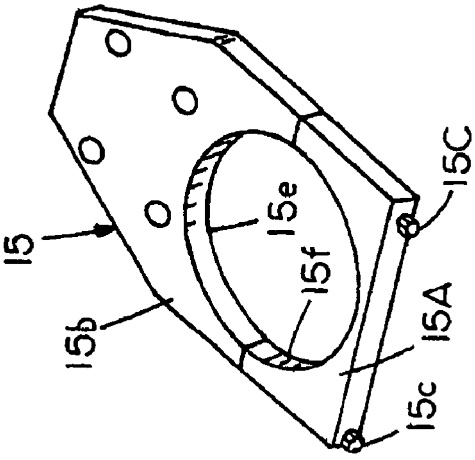
FIG. 1A is an isolated view of a mounting bracket for mounting the vibrator on a conveying conduit.

The vibrator herein may be used with a number of different devices including bin feeders, rail cars or other devices that require a vibrating action. FIG. 1 is a perspective view of an example of a conveying system 10 with a vibrator 11 secured thereto. The system includes a pneumatic conveying conduit 12 with a non-impacting vibrator 11 secured thereto by a first end mounting plate 14 having a top member **14*b* secured to one end of vibrator 11 by bolts (not shown) and a curved end extending partially around the outer surface of conduit 12 and into contact with the conduit 12. A bottom member 14*a* of mounting plate 14 is secured to top member 14*b* by bolts 14*c*. Similarly, a second end mounting plate 15 having a top member 15*b* is secured to the opposite end of vibrator 11 by bolts 17 and a curved end extending partially around the outer surface of conduit 12 and into contact with conduit 12. A bottom member 15***a* of mounting plate 15 is secured to top member 15*b* by bolts 15*c* located on opposite sides of the mounting plate 15 to thereby clamp the conduit 12 therein. End mounting plates 14 and 15 are identical to each other and can be clamped tightly around the external surface of rigid conduit 12 to enable the vibratory action of the vibrator 11 to transfer vibration energy to conduit 12 to dislodge any material that becomes stuck within the conveying conduit 12. Typically, the vibrator is placed at a curve of the conduit since material can more frequently lodge where the conveying conduit changes directions although the vibratory can be placed in other areas where lodging can occur.

Figure 1:
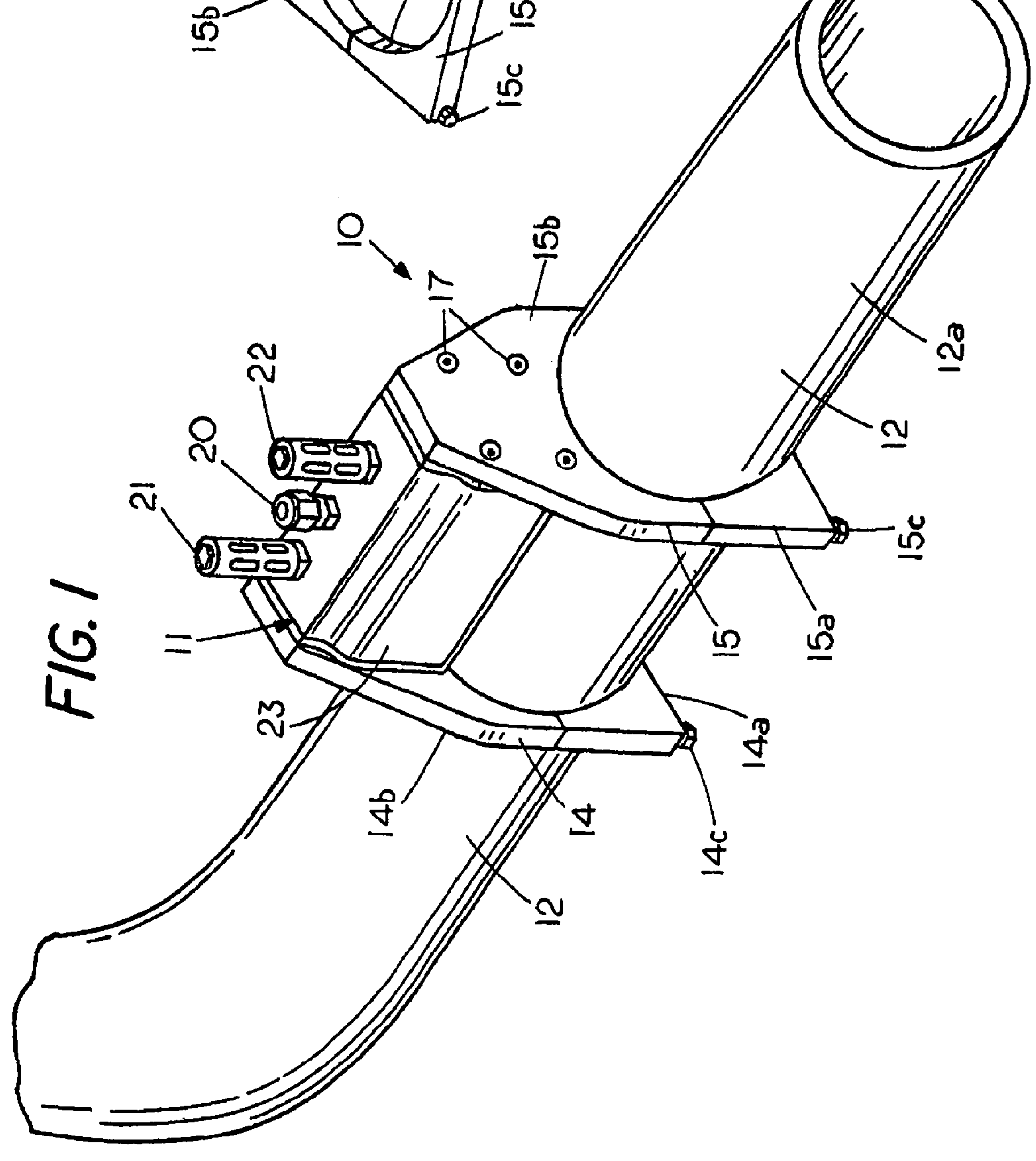
FIG. 1 is a perspective view of the non-impacting vibrator mounted on a conveying line.

The mounting plate 15, which clamps to the conveying conduit 12, is shown in isolated perspective view in FIG. 1A to reveal the top member 15*b* having a semi-cylindrical surface 15*e* and the bottom member 15*a* having a semi-cylindrical surface 15*f* for mating and forming clamping engagement with the outer peripheral surface 12*a* of the pneumatic conduit 12 so that vibrations from the vibrator 11 are transmitted to the conveying conduit 12 to thereby dislodge material therein.

FIG. 1 shows that the vibrator 11 includes a housing 23 having a fluid inlet 20 and a first discharge vent valve 21 and a second discharge vent valve 22 that allow fluid to escape from within the vibrator 11. In operation fluid inlet 20 is connected to a source of high pressure fluid such as compressed air, which flows into fluid inlet 20 and is alternately discharged through vent valve 21 and vent valve 22.

Figure 2:
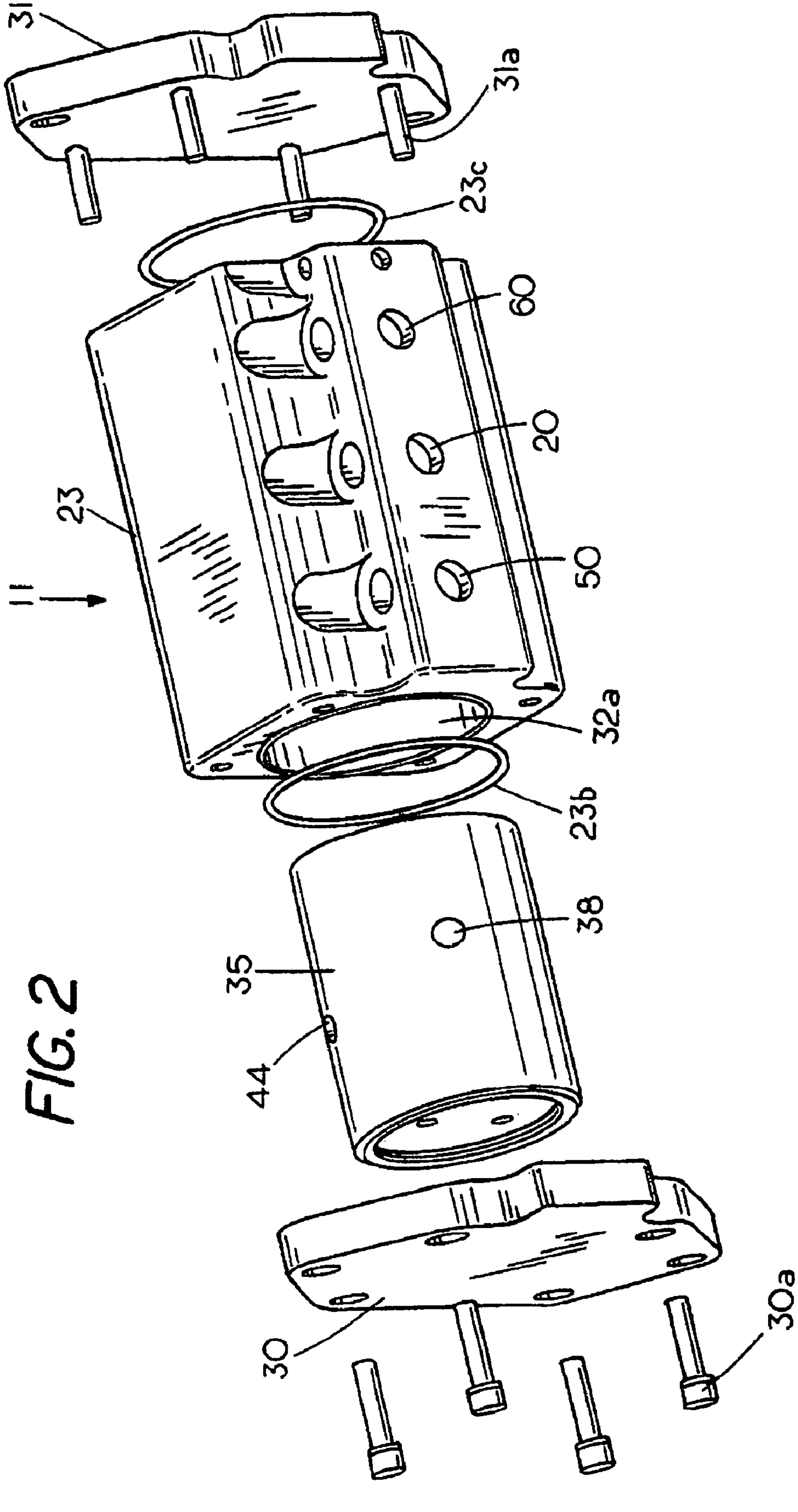
FIG. 2 is an exploded view of the vibrator showing the piston and the housing.

Referring to FIG. 2 linear vibrator 11 is shown in an exploded view revealing vibrator end plate 30 that can be secured to cylindrical housing 23 by bolts 30*a* and vibrator end plate 31 that can be secured to cylindrical housing 23 by bolts 31*a* so that the end plates 30, 31 and the housing 23 form an elongated cylindrical chamber having an elongated cylindrical bearing surface 32*a* for a one-piece piston 35 to rotationally oscillate back and forth therein. A sealing ring 23*b* is located between housing 23 and end plate 30 and similarly a second sealing ring 23*c* is located between end plate 31 to seal the ends of chamber 39. Housing 23 includes an inlet port 20 and a first outlet port 50 and a second outlet port 60.

Figure 3:
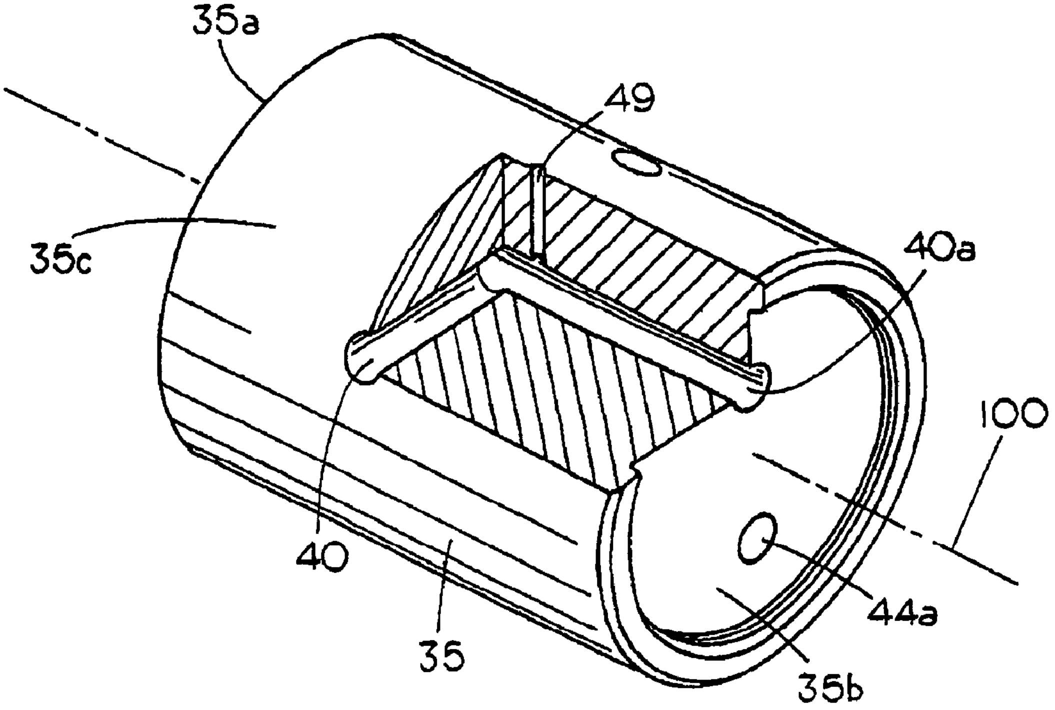
FIG. 3 is a perspective view, partly in section, of a piston.
Figure 4:
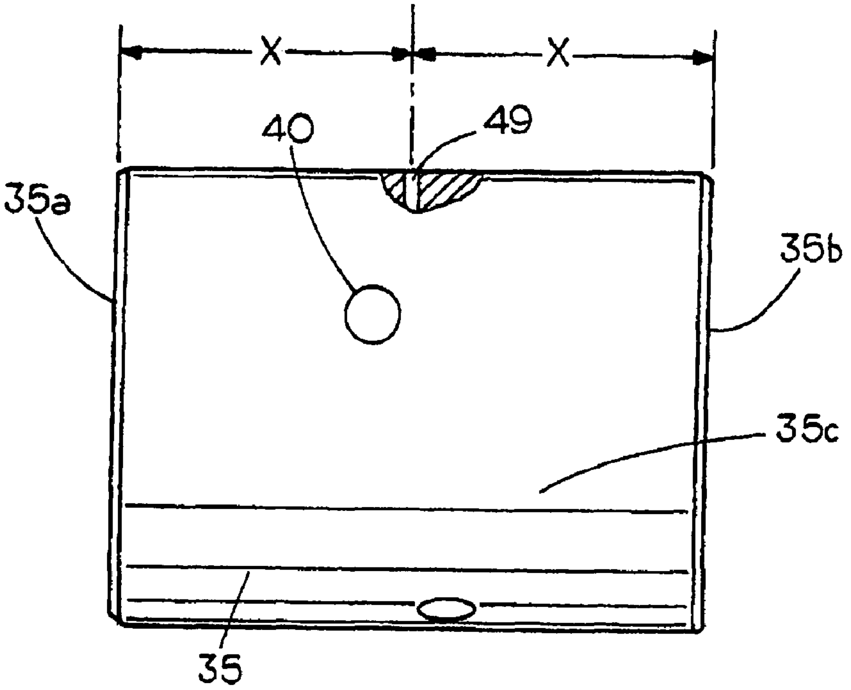
FIG. 4 is a front view of the piston of FIG. 3.
Figure 4A:
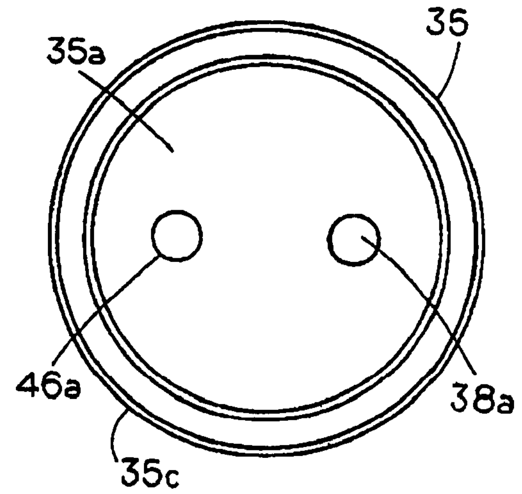
FIG. 4A is an end view of one end of the piston of FIG. 3.
Figure 4B:
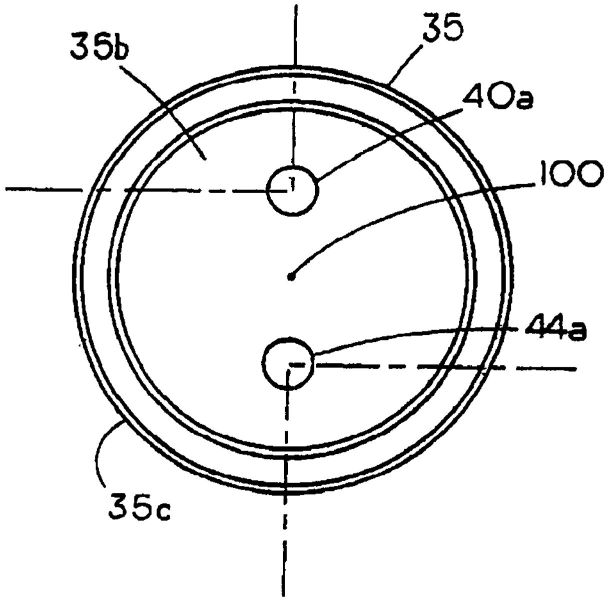
FIG. 4B is an end view of the opposite end of the piston of FIG. 3.
Figure 5:
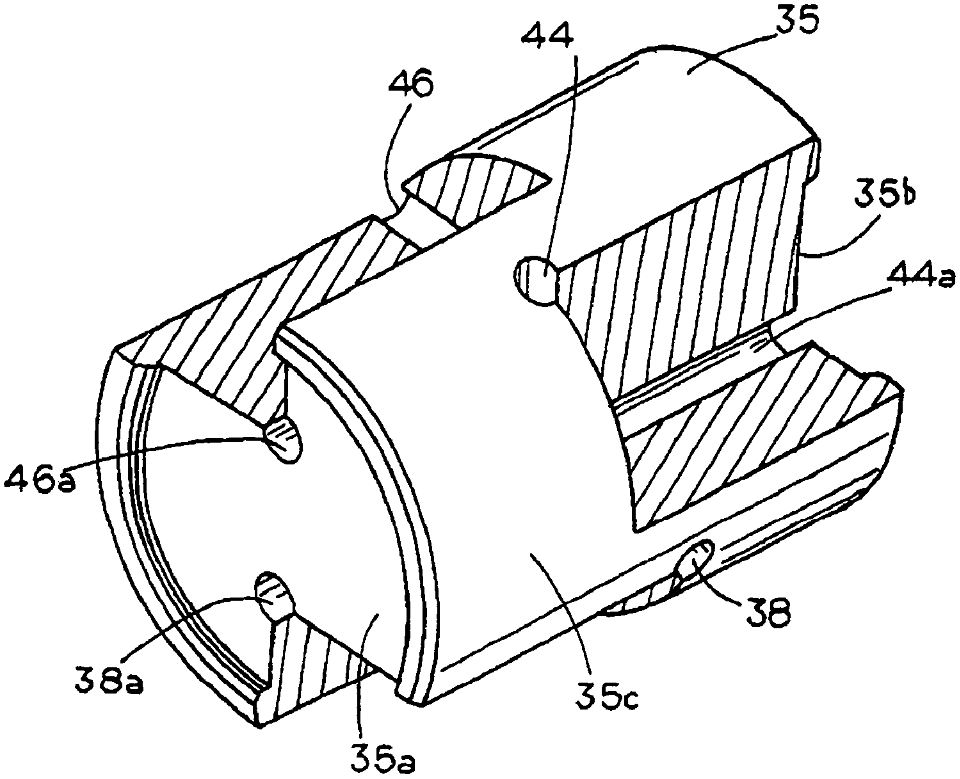
FIG. 5 is a perspective view of the piston of FIG. 3 in a multiple section view.

Piston 35 is shown in perspective and in section in FIG. 3 and FIG. 5 and in a frontal view in FIG. 4. FIG. 4A shows a left end view of piston 35 and FIG. 4B shows a right end view of piston 35. References to the views reveals that piston 35 has a first end 35*a* and a second end 35*b* with dynamic piston exhaust ports 40*a* and 44*a* located in end 35*b* and dynamic piston exhaust ports 38*a* and 46*a* located in end 35*a*. FIG. 3 reveals that a dynamic offset piston inlet port 40 connects to a first dynamic outlet piston port 40*a* with port 40 radially offset from a central axis 100 of piston 35. By dynamic it is meant that the piston ports directly contribute to the continually oscillation of the piston 35 by directing fluid therethrough which alternately causes reversal in the pressure differential across piston 35.

FIG. 5 shows that piston port 46 discharges fluid through exhaust port 46*a* on end 35*a* and that piston port 44 discharges fluid through piston exhaust port 44*a* on the opposite end 35*b*. Similarly, piston port 38 discharge fluid through exhaust port 38*a* on end 35*a* and FIG. 3 shows that piston inlet port 40 discharges fluid through piston exhaust port 40*a* on end 35*b*. In the example shown there are provided two offset circumferential piston inlet ports 38 and 46 that vent toward one end of the piston and two offset circumferential piston inlet ports 40 and 44 that vent toward the opposite end of the piston. While two offset outlet piston ports are shown directing fluid toward each end more or less offset outlet piston ports can be used to direct fluid toward each end as long as there is at least one piston exhaust port in each end face of the piston.

Figure 4C:
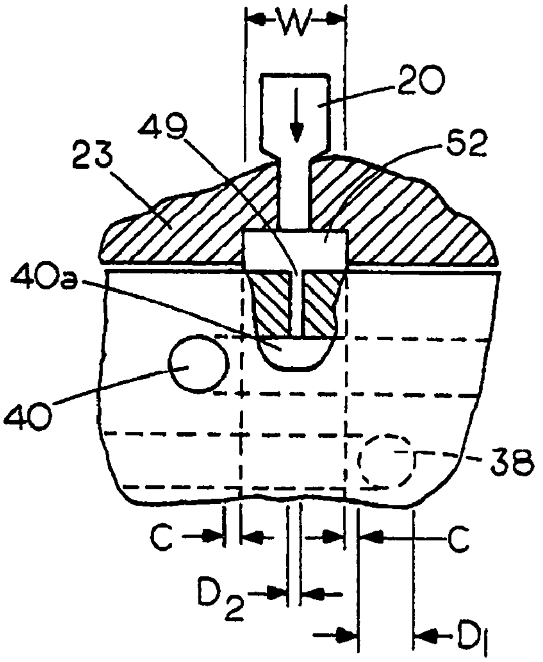
FIG. 4C is a partial section view showing the axial relation of the offset ports and the static port to the annular inlet chamber in the housing.

FIG. 4 shows a partial section front view of piston 35 revealing a static piston port 49 located a distance midway X between end 35*a* and end 35*b* of piston 35. By static port it is meant that the port does not appreciably contribute to the dynamic alternate reversal of the pressure differential across piston 35. Reference to FIG. 4C shows an enlarged view of a portion of piston 35 and housing 23 revealing the location of the piston 35 with respect to housing 23 during a piston dead center condition. In the dead center condition the fluid enters inlet 20 (see arrow) and flows into annular inlet chamber 52 that extends around the interior of housing 23.

In the dead center condition the circumferential piston inlet port 40, which discharges through piston end face 35*b*, has the edge of port 40 spaced a distance C from one side of the annular chamber 52 and the circumferential piston inlet port 38, which discharges through opposite end face 35*a* has an edge that is also spaced a distance C from the opposite side of annular chamber 52. In this condition neither of the offset piston inlet ports 40 or 38 can directly receive fluid from the annular chamber 52 since they are not in direct fluid alignment with each other. Similarly, neither offset piston ports 44 and 46 (see FIG. 5) can directly receive fluid from chamber 52.

When none of the dynamic circumferential offset inlet ports 44, 46, 38 and 40 can directly receive fluid from annular chamber 52 the forces acting on piston 35 are generally insufficient to overcome the inertia or adhesion of piston 35 so as to initiate piston oscillation. Although neither of the dynamic circumferential offset inlet ports 44, 46, 38 and 40 can directly receive fluid from annular chamber 52 a static port 49 which connects to passage 40*a* can directly receive fluid from chamber 52*a*. However, the static port 49 has a diameter $D_2$ that is small in comparison to the diameter $D_1$ of the piston input port 46. Although static port 49 is small in comparison to the dynamic piston input ports the direct flow of fluid into passage 46 from static port 49 causes piston 35 to move from the dead center position as pressure increases on the chamber on the right end of piston 35. The pressure buildup displaces piston 35 thus bringing the annular chamber 52 into a direct fluid flow condition with passage 38 which thus initiates the oscillation of the piston 35 within the vibrator. Since the static port 49 is small in relation to circumferential piston ports 44, 46, 38 and 40 it does not interfere with the oscillation of the piston as described hereinafter. As a consequence static port 49 generates a biasing force on piston 35 eliminating the need for a mechanical spring to move the piston 35 from a dead center condition. In general, the flow area of the static port 49 should be sufficient small so as to allow air to enter port 40*a* and slowly increase the pressure in an end chamber. For example, it has been found that static port 49 may have a diameter of 0.050 inches while each of offset ports have a diameter of 0.375 inches. The relationship of the flow area of the static port to the flow area of the dynamic piston port is given by way of example and can depend on various factors including how long one may want to wait for startup initiation. In any event maintaining the flow area of the static port 49 less than the flow area of the outlet ports and preferably small in relation to the flow area of the dynamic inlet piston ports 44, 46, 38 and 40 and there corresponding outlet ports can proportional decrease port 49 having any effect on the dynamic operation of the vibrator. On the other hand increasing the flow area of the static port 49 in relation to the flow area of the dynamic piston ports 44, 46, 38 and 40 and there corresponding outlet ports may increase an effect on the operation of the vibrator.

Figure 6:
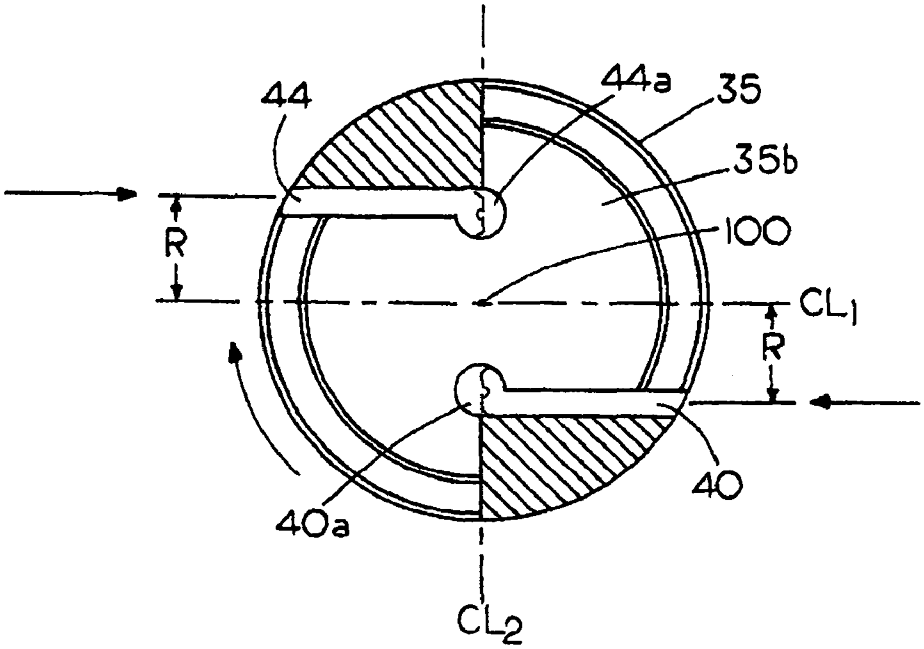
FIG. 6 is an end view of the piston of FIG. 3 partially in section showing the location of the offset inlet ports to a central axis of the piston.

To understand the rotational inducement of piston 35 reference should be made to FIG. 6 which shows a partial cross section end view of piston 35 showing that peripheral inlet port 40 is offset from center 100 by a distance R, and similarly peripheral inlet port 44 is radially offset from center 100 in the opposite direction by a distance R. Arrows indicate the direction of fluid flow into and through port passage 44 and port passage 40. The flow of fluid into piston 35 through ports 40 and 44, which are offset from the center 100 of the piston 35, produces a torque (indicted by curved arrow) about center 100 that causes rotation of piston 35 in the direction of the curved arrow. Similarly piston inlet ports 38 and 46 are offset to contribute to rotation of piston 35. As the piston 35 rotates within the vibrator it has been found to enhance the operation of the vibrator, that is extending the operational life of the vibrator possibly through a more stable fluid bearing about piston 35. FIG. 6 shows the two offset inlet ports 44 and 40 coact to apply a rotational force about center 100 while the other offset inlet ports 38 and 40 also apply a rotational force about center 100. While four offset inlet piston ports are shown to provide a rotational force, rotation can also be achieved with one, two or three offset piston ports. Similarly 5 or more offset piston ports may be used to enhance rotation of piston 35. In addition the offset distance of the piston port may be lengthened or shortened to provide the desired rotational energy to the piston 35.

In addition to the offset dynamic piston inlet ports 38, 46, 40 and 44 located in piston 35 vibrator 11 includes an integral start up comprising a static piston port 49 that can bias the piston 35 to one side of the vibrator 11 so to initiate piston oscillation. That is, from time to time the piston 35 may stop at the dead center position (see FIG. 9). As pointed out herein in the dead center position the fluid injected through central port 20 may not initiate oscillatory motion of the piston 35 as the pressure may remain equal in the end chambers since the housing inlet port 20 in the housing 23 is not in direct fluid communication with either of the piston ports 38, 46, 40 and 44. In the example shown, the static port 49, which moves the piston toward and end of the chamber during startup, does not interfere with the dynamic back and forth action of piston 35 and is preferable extended radially inward (see FIG. 3) so as not to interfere with any rotational forces on piston 35.

Figure 7A:
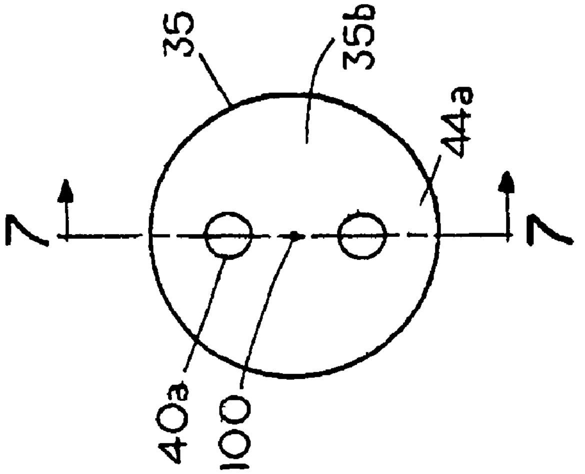
FIG. 7A is an end view of the piston as positioned in FIG. 7.
Figure 7:
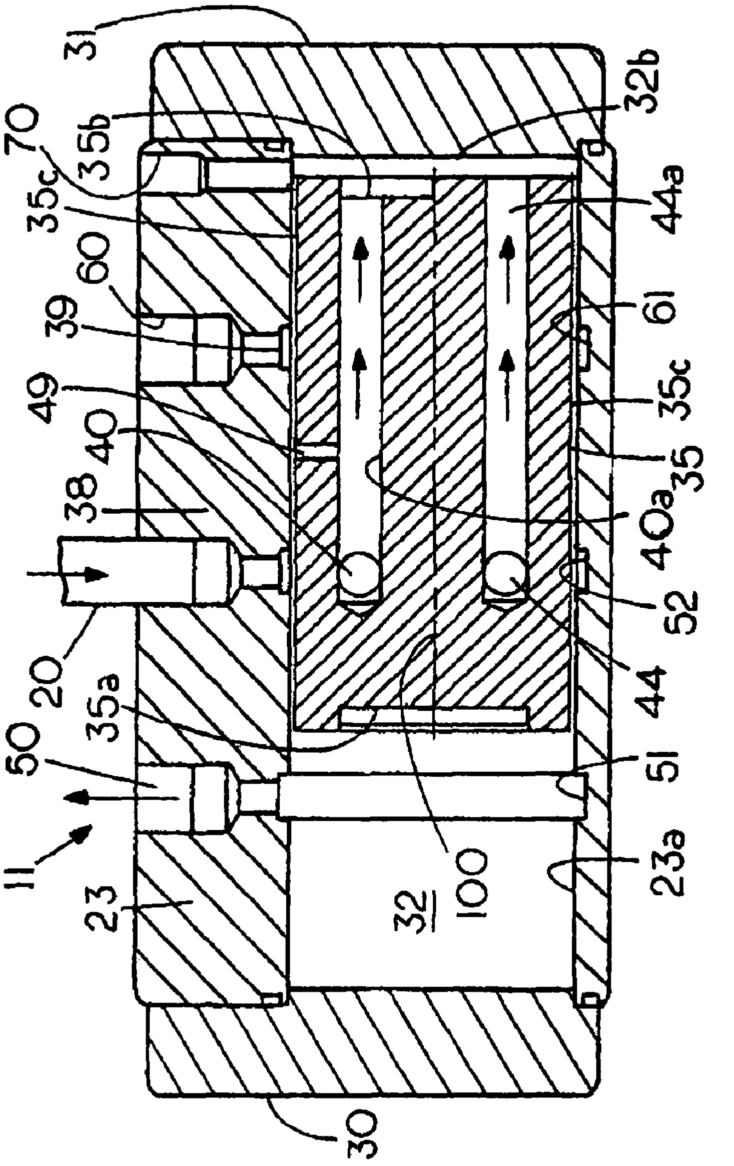
FIG. 7 is a section view of the vibrator with the piston therein in a first axial position.
Figure 8A:
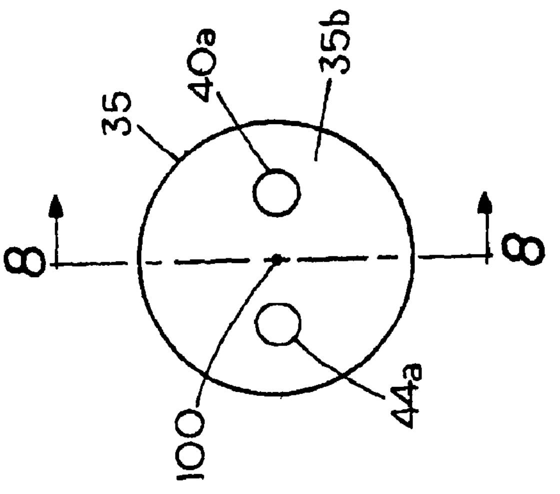
FIG. 8A is an end view of the piston as positioned in FIG. 8 illustrating the piston rotated 90 degrees from the condition shown in FIG. 7.
Figure 8:
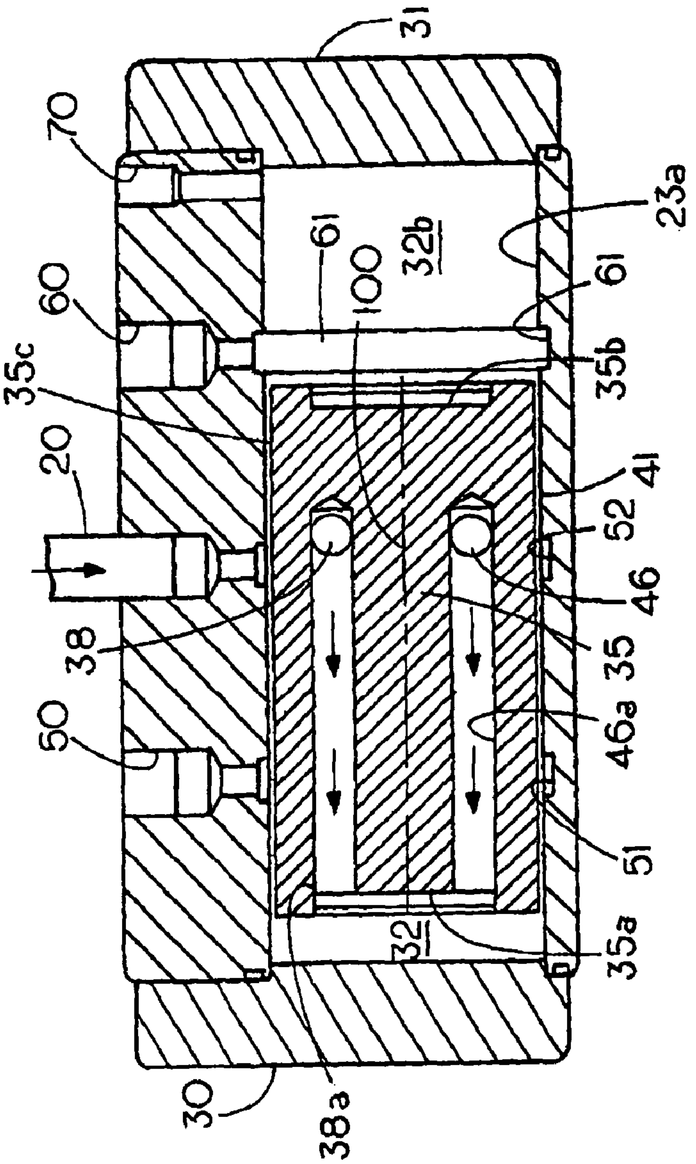
FIG. 8 shows a section view the vibrator of FIG. 7 with the piston in a second axial position and rotated 90 degrees from the condition shown in FIG. 7.
Figure 9A:
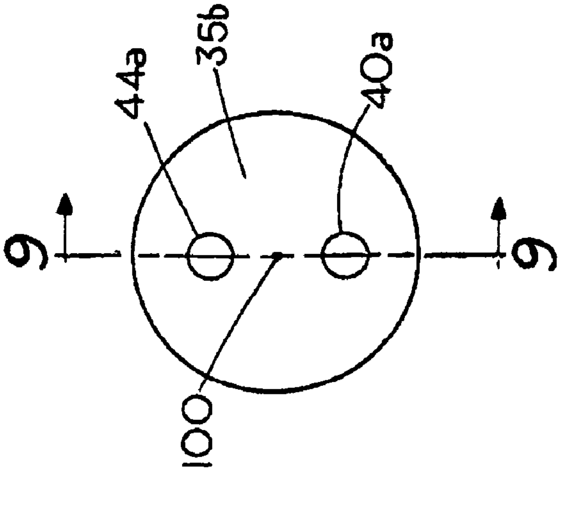
FIG. 9A is an end view of the piston as positioned in FIG. 9 illustrating the piston rotated 180 degrees from the condition shown in FIG. 7.
Figure 9:
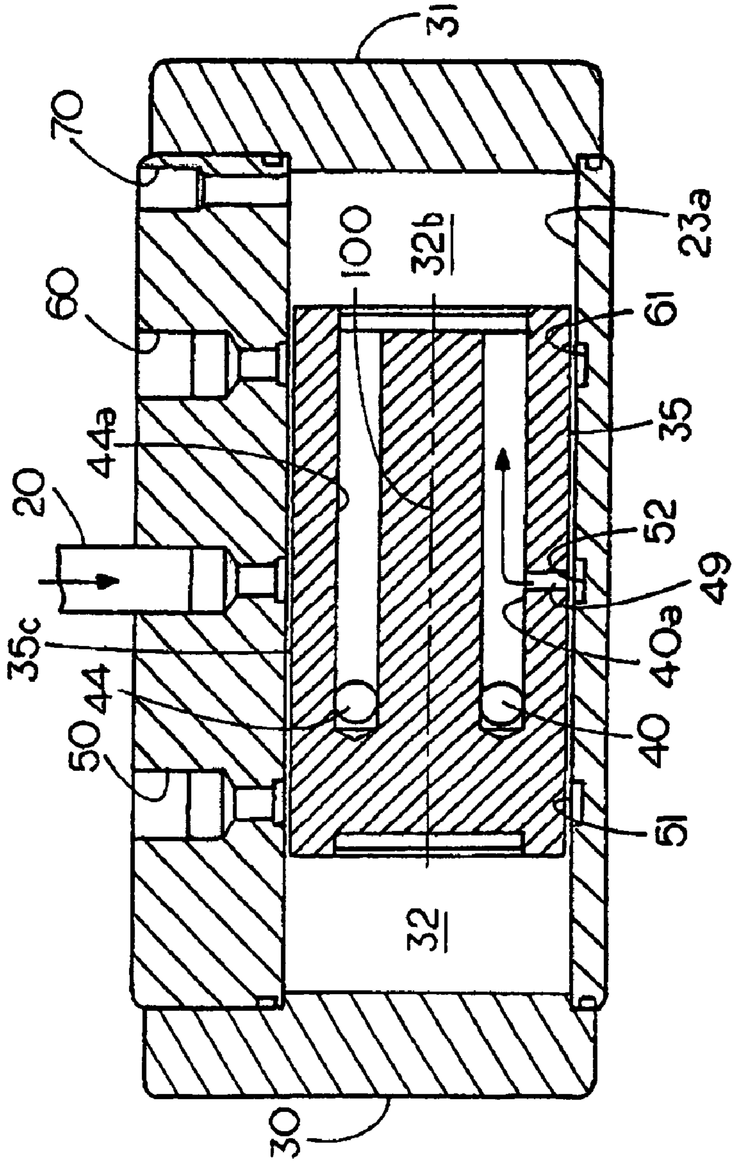
FIG. 9 shows the piston in a dead center condition.

To illustrate the rotation and axially oscillation of piston 35 reference should be made to FIG. 7, FIG. 8 and FIG. 9. FIG. 7 shows that housing 23 includes a set of three circumferential grooves forming three annular plenum chambers. A first circumferential groove 51 connects to outlet port 50, a second circumferential groove 52 connects to inlet port 20 and a third circumferential groove 61 connects to outlet port 60. In addition, there is sufficient clearance between piston 35 and housing 23 to form an annular gap between the external surface 35*c* of piston 35 and the cylindrical surface 23*a* which allows a portion of the fluid from port 20 to flow through the annular gap to form a fluid bearing supporting piston 35. The fluid bearing enables piston 35 to slide relatively frictionless back and forth as well as to rotate about axis 100. The remaining portion of the fluid from inlet 20 flows through the piston ports 40, 44, 38 and 46 before being discharged though either the outlet port 50 or the outlet port 60.

While the fluid bearing created by the flow of air into the vibrator inlet port 20 provides for relatively frictionless rotation and oscillation of the piston 35 it does not always provide automatic start-up of the vibrator 11 if the piston 35 happens to be in a dead center condition. However, once the piston 35 has been displaced from the dead center condition forces generated by fluid flowing through inlet port 20 and out of outlet ports 50 and 60 sustain the oscillations of piston 35. When in the dead center condition adhesion forces between the piston 35 and the housing 23 may cause the piston to stick or not begin oscillating when air is introduce into inlet port 20. To avoid start up failure of the vibrator if the piston 35 happens to stop on dead center and yet not interfere with the dynamic operation of the vibrator there is provided a static biasing piston port 49 having a cross sectional area considerably less than the cross sectional area of the offset inlet ports. That is, the amount of fluid that can flow through biasing port 49 is small in comparison to the amount of fluid that can flow through the offset ports. For example, 10% or less, however, the relative ratio of the flow area between the static port and two offset ports can vary depending on the size and mass of the piston as well as the fluid pressure at the inlet. An optional feature is to include an end port 70 that can bias piston 35 by separately injecting fluid into chamber 32*b*. However, the static port 49 can eliminate the need for an additional port since the incoming fluid in port 20 will both initiate displacement of piston 35 and generate an oscillatory action of piston 35.

To illustrate the various positions of piston 35 in vibrator 11 during operation of the vibrator reference should be made to FIG. 7, FIG. 8 and FIG. 9. FIG. 7 shows the piston 35 located on the right side of housing 23 with the rotational orientation of the piston 35 therein indicated by end view 7A. Similarly, FIG. 8 shows the piston 35 located on the left side of housing 23 with the rotational orientation of the piston 35 therein indicated by end view 8A. FIG. 9 shows the dead center condition wherein piston 35 is located midway between end plates 30 and 31 and the rotational orientation of piston 35 shown in end view of FIG. 9A.

In operation of the vibrator 11*a* fluid, such as air, is introduced into inlet 20. The air flows around piston 35 as well as into an annular plenum chamber formed by circumferential groove 52 wherein it enters offset inlet port 40 and flows out through end port 40*a* into end chamber 32*b* located on the right side of vibrator 11 to thereby increase the pressure in end chamber 32*b*. In addition the air in the annular chamber formed by circumferential groove 52 also enters offset inlet port 44 and flows through end port 44*a* and into end chamber 32*b* located on the right side of vibrator 11 to increase the pressure in end chamber 32*b* and drive piston 35 toward the left end of housing 23.

In the meantime air in chamber 32 discharges through port 50. That is, with air directed into the end chamber 32*b* through the inlet port 40 and inlet port 44 the opposite occurs in the chamber 32 on the left side of piston 35 which vents air to the atmosphere through port 50. As the pressure increases in chamber 32*b* and decreases in chamber 32 it creates a pressure differential across piston 35 that drives the piston 35 to the left. At the same time fluid flows between piston external bearing surface 35*c* and housing internal bearing surface 32*a* to provide a fluid bearing. Because of the pressure differential across the piston 35 with the greater pressure in chamber 32*b* the piston 35 continues to move to the left side of chamber 32 (FIG. 8). This has a dual effect, first air is forced out or vented through outlet port 50 as the piston 35 moves toward end plate 30. Also as piston end 35*a* gets closer to end plate 32 the outlet port 50 is substantially sealed off by piston 35 thereby allowing the pressure to increase in chamber 32 as fluid enters through ports 38 and 46 to generate an air cushion sufficient to prevent the piston 35 from contacting end plate 30. In addition, to the axial displacement of piston 35 to the left the air from inlet port 20 entering offset inlet port 38 and offset inlet port 36 produces a torque on piston 35 causing rotation of piston 35 about central piston axis 100.

FIG. 7*a* is an end view of piston 35 showing the rotational orientation of piston 35 at a first time while FIG. 8A is an end view of piston 35 of FIG. 8 at a later time. The end view of FIG. 8A illustrates that piston 35 has rotated 90 degrees from the position shown in FIG. 7A. At the same time the piston 35 rotates the fluid in chamber 32*b* vents to the atmosphere through port 60 thereby decreasing the pressure therein while the pressure is being increased in chamber 32 thereby generating a differential force across piston 35 to drive the piston 35 toward the opposite end. As a result of the continually reversing of the pressure differential forces across the piston 35 it causes an axial oscillation of piston 35 within housing 23 while the delivery of fluid through offset piston inlet ports produces rotation of piston 35. The result is that the housing 23 vibrates in response to the rotating axially oscillating mass i.e. piston 35 in the housing 23. Thus, a one-piece piston 35 can rotationally oscillate back and forth within a housing to produce the necessary vibration. The combination of oscillating the piston 35 along a central axis as well as rotation around central axis 100 has been found to provide an enhanced life of the vibrator.

FIG. 9 illustrates the operation of static port 49 if piston 35 should happen to stop in dead center position. In the dead center position the inlet port 20 and annular chamber 52 are not in direct fluid communication with any of the offset ports 40, 44, 38 or 46. However, a centrally positioned static port 49, which is located between the offset ports is in fluid communication with the annular chamber 52. Consequently, high pressure fluid from annular chamber 52 enters static port 49 and port 40*a* to generate a bias pressure in chamber 32*b* which forces piston to the left off of the dead center position. Once off the dead center position the oscillation begins as described above. That is the offset pressure ports 38, 46, 40 and 44 can alternately be in fluid communication with inlet 20 to initiate the vibration of piston 35.

A reference to FIG. 4C provides an enlarged view of the port 40 and port 38 in phantom to illustrate the positioning of the offset ports in regard to the annular chamber 52. As can be seen the offset inlet ports 40 and 38 are located a distance C from the edge of the annular chamber 52 and therefore do not directly received air from annular chamber 23. However, in the dead center position the piston static port 49 is in alignment with the annular chamber 52 in housing 23 which allows air to enter port 40*a* to bias the piston to one side of the housing and thereby initiate oscillation.

As can be seen by the above the invention includes a method of ensuring vibration of a vibrator comprising the steps of introducing a portion of a fluid into a static piston port 49 while introducing a further portion of the fluid between a bearing surface and a piston slideable therein to provide a fluid bearing therebetween. By venting both ends of a piston chamber a fluid directed into the piston chamber through offset piston ports alternately discharges from opposite ends of the chamber to produce axial oscillation of piston while simultaneously rotating the piston about a central axis of the piston.

We claim:

1. A non-impacting vibrator comprising:

a housing having an inlet port and a first and second outlet port, said housing having an interior surface forming a chamber therein;

a piston having a central axis and an exterior surface with said piston slideable and rotateable in the chamber, said piston having a first inlet port offset from said central axis and fluidly connected to a first end port on a first end of the piston and a second inlet port offset in an opposite direction from the central axis with said second port fluidly connected to a second end port on the opposite end of the piston so that when a fluid is introduced into the first inlet port a torque or the second inlet port a torque is applied to the piston to rotate and oscillate the piston along the central axis.

2. The non-impacting vibrator of claim 1 including a static inlet port equally spaced from the first end of the piston and the second end on the piston.

3. The non-impacting vibrator of claim 1 wherein the cross sectional flow area of static inlet port is less than the cross sectional area of the offset port so as to not to interfere with the dynamic operation of the vibrator.

4. The non-impacting vibrator of claim 1 including a first mounting plate secured to a first end of the housing and a second mounting plate secured to a second end of the housing.

5. The non-impacting vibrator of claim 4 including a fluid conveying conduit with the fluid conveying conduct secured to the first mounting plate and the second mounting plate to thereby transfer vibrations to the fluid conveying conduit.

6. The non-impacting vibrator of claim 4 wherein the first mounting plate and the second mounting plate are secured to an external surface of the fluid conveying conduit by clamping.

7. A non-impact vibrator comprising:

a housing having an internal bearing surface forming a chamber therein and a fluid inlet to direct fluid into the chamber;

a mass having a set of axially offset fluid passages therein and a set of axial end ports connected thereto with said mass having an external bearing surface located thereon to permit the mass to rotate as the mass slides back and forth in the chamber on a fluid bearing formed between the internal bearing surface and the external bearing surface; and an integral startup located midway between a first end of the mass and a second end of the mass so that when the mass is on a dead center position in the chamber the fluid inlet directs fluid into a static port to bias the mass toward an end of the chamber.

8. The vibrator of claim 7 including at least two inlet ports on said mass with each of the at least two inlet ports offset from a central axis of said mass.

9. The vibrator of claim 7 including a pneumatic conveying tube having the vibrator secured thereto.

10. The vibrator of claim 9 wherein an axis of oscillation of the piston is parallel to a flow axis of the pneumatic conveying tube.

11. The vibrator of claim 7 wherein the integral start-up system comprises the static piston port.

12. The vibrator of claim 7 including a fluid port proximate an end of the chamber to momentarily change the differential pressure on across the piston therein to thereby initiate displacement of the piston.

13. The method of ensuring vibration of a vibrator comprising the steps of:

introducing a portion of a fluid into a static piston port or an offset piston inlet port;

introducing a further portion of the fluid between a bearing surface and a piston slideable therein to provide a fluid bearing therebetween; and venting both ends of a piston chamber so that a fluid directed into the piston chamber alternately discharges directly to the atmosphere from opposite ends of the chamber to produce axial oscillation of piston while simultaneously rotating the piston about a central axis.

14. The method of claim 13 including the step of momentarily venting an end port of the piston chamber to provide a second on-demand start-up system.

15. The method of claim 14 including the step of directly injecting fluid into the static piston port when the piston is in a dead center condition.

16. The method of claim 15 including the step of directing fluid through at least two offset piston inlet ports.

17. The method of claim 16 including the step of directing fluid from the offset piston inlet ports comprises directing fluid through a first end of the piston and then directing fluid through an opposite end of the piston.

18. The method of claim 17 including the step directing fluid into offset piston inlet ports that are equally spaced from a central axis of the piston.

19. The method of claim 18 including the step of directing fluid into at least four offset piston inlet ports.

20. The method of claim 19 including the step of discharging fluid from the at least four inlet ports through at least four separate outlet ports with at least two outlet ports located in each end.

* * * * *

UNITED STATES PATENT AND TRADEMARK OFFICE

CERTIFICATE OF CORRECTION

PATENT NO. : 7,963,207 B2
APPLICATION NO. : 12/150782
DATED : June 21, 2011
INVENTOR(S) : Hansen et al.

It is certified that error appears in the above-identified patent and that said Letters Patent is hereby corrected as shown below:

On the Title page should read, item [73] Assignee:

"Dynamil Air Inc." should read --Dynamic Air, Inc--

Claims:

Claim 1, col. 8, line 2 "second port" should read --second inlet port--

Claim 5, col. 8, line 21 "conduct" should read --conduit--

Claim 12, col. 8, line 26 delete "on"

Claim 13, col. 9, line 1 "of piston" should read --of the piston--

Signed and Sealed this
Thirteenth Day of September, 2011

David J. Kappos
*Director of the United States Patent and Trademark Office*